(12) United States Patent
Chung

(10) Patent No.: US 9,396,187 B2
(45) Date of Patent: Jul. 19, 2016

(54) SYSTEM AND METHOD FOR USING NETWORK EQUIPMENT TO PROVIDE TARGETED ADVERTISING

(75) Inventor: Eddie Chung, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 548 days.

(21) Appl. No.: 13/170,408

(22) Filed: Jun. 28, 2011

(65) Prior Publication Data

US 2013/0007006 A1    Jan. 3, 2013

(51) Int. Cl.
*G06F 17/30* (2006.01)
*G06Q 30/02* (2012.01)

(52) U.S. Cl.
CPC ............ *G06F 17/30* (2013.01); *G06Q 30/0251* (2013.01)

(58) Field of Classification Search
CPC ....... G06F 21/31; G06F 21/445; G06F 21/79; G06F 2212/7201; G06F 17/30867; G06F 17/5054; G06F 17/5068; G06F 17/5077
See application file for complete search history.

(56) References Cited

U.S. PATENT DOCUMENTS

| | | | | |
|---|---|---|---|---|
| 5,542,090 | A | * | 7/1996 | Henderson et al. |
| 7,765,204 | B2 | * | 7/2010 | Gollapudi et al. ............ 707/721 |
| 8,344,233 | B2 | * | 1/2013 | Cai et al. ......................... 84/602 |
| 2005/0193015 | A1 | * | 9/2005 | Logston ............ G06F 17/30058 |
| 2006/0155751 | A1 | * | 7/2006 | Geshwind et al. ............ 707/102 |
| 2007/0214133 | A1 | * | 9/2007 | Liberty et al. ..................... 707/5 |
| 2007/0255698 | A1 | * | 11/2007 | Kaminaga et al. ................ 707/3 |
| 2008/0256056 | A1 | * | 10/2008 | Chang et al. ...................... 707/5 |
| 2010/0274753 | A1 | * | 10/2010 | Liberty et al. .................. 706/50 |
| 2011/0276374 | A1 | * | 11/2011 | Heiser, II .......... G06F 17/30867 705/14.13 |
| 2012/0117400 | A1 | * | 5/2012 | Vandwalle et al. ........... 713/320 |

* cited by examiner

*Primary Examiner* — Angelica Ruiz
(74) *Attorney, Agent, or Firm* — Oblon, McClelland, Maier & Neustadt, L.L.P

(57) ABSTRACT

A search request received from a user is converted to a search request integer value using an operational portion of a chip in network equipment. The search request integer value is compared to representative data integer values that were previously converted from a dataset of search terms using the operational portion, the representative integer values being stored on the chip. If the comparing is successful, a signal is transmitted to a second database, the signal being used to determine a message to be transmitted to the user that corresponds to the representative data integer.

20 Claims, 7 Drawing Sheets

SYSTEM AND METHOD FOR USING NETWORK EQUIPMENT TO PROVIDE TARGETED ADVERTISING

FIELD OF THE INVENTION

The present invention generally relates to a system and method for using network equipment to provide messages to users corresponding to search terms of a search request.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
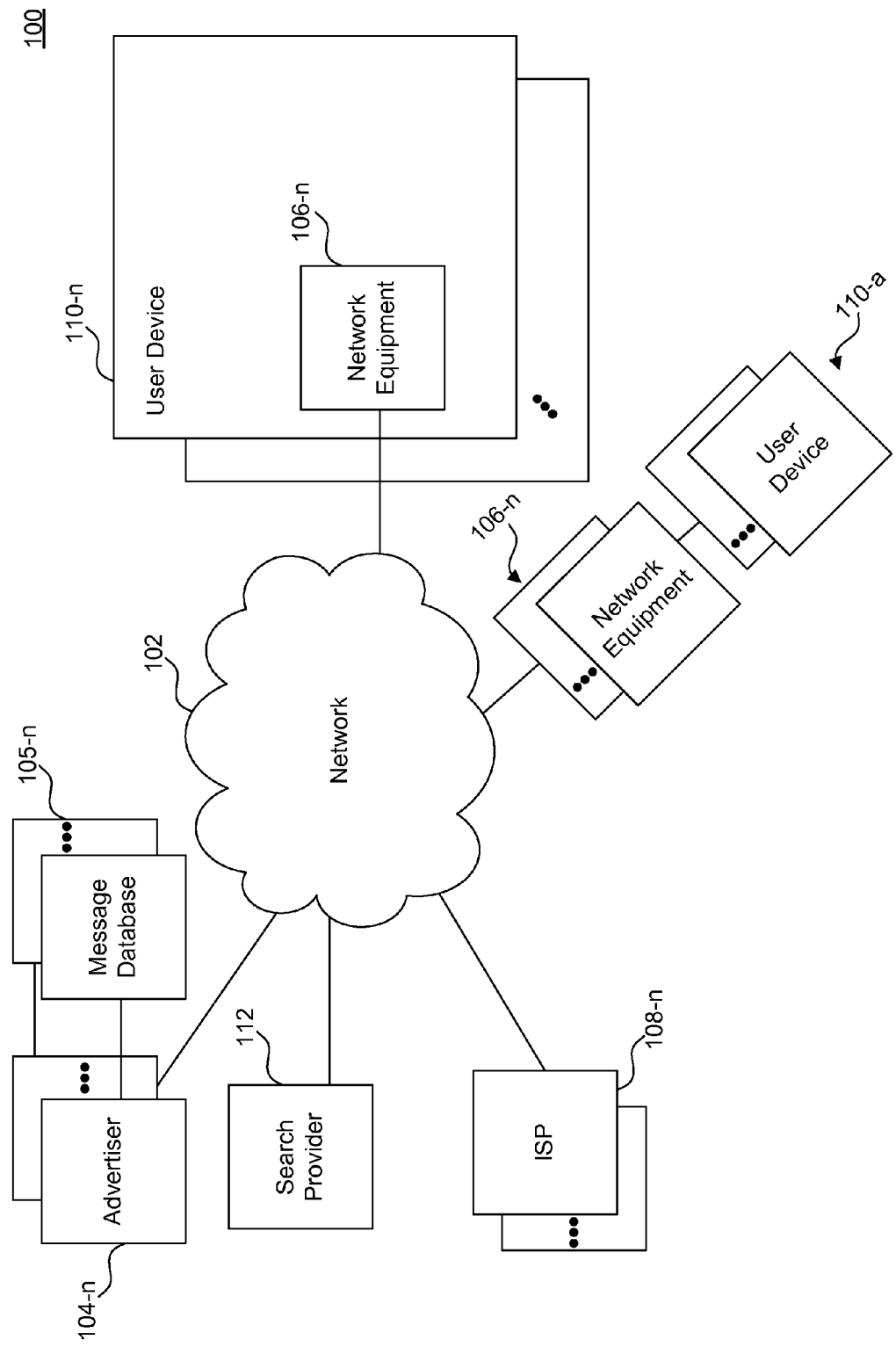
FIG. 1 shows a system, according to an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Traditionally, when performing an internet search, a user generates and transmits a search request made up of search terms from a user device. The search request passes through one or more pieces of network equipment being provided, e.g., by an Internet Service Provider ("ISP"). The search request is finally received by a search provider, e.g., Google®, Yahoo®, etc. The search provider uses the search request to generate and transmit search results. In addition to the search results, the search provider generates revenue, in part, by forwarding targeted messages, e.g., advertisements, political messages, etc., to users based on search terms being used in search requests. For example, a large database of advertisements could be associated with the search provider equipment. Also, the searches place a large burden on the ISP network bandwidth with no monetary benefit to the ISP.

Current ISPs have dedicated systems centralized in the core of the network used for billing and monitoring. These systems could be used to perform deep packet inspection for targeted advertisements. However, the dedicated systems cannot scale since these systems will become a bottleneck due to limited processing power.

Further, the network equipment of the ISP is not currently equipped with enough processing power or memory to use search terms passing through the equipment to match the terms to targeted advertisement. Thus, although every single search request must pass through the one or more pieces of network equipment of an ISP, the ISP does not have the ability to utilize the equipment to generate revenue from advertisers through allowing matching of the search terms to initiate transmitting of targeted advertisements.

Therefore, what is needed is a system and method that allows for processing of a search request on service provider network equipment in order to match, access and transmit messages corresponding to the search request to a user.

According to a first embodiment, there is provided a chip on service provider network equipment. The chip comprises an operational portion, a first database, and a transmitter. The operational portion is configured to receive a search request from a user, to generate a search request integer based on performing a mathematical function on the search request, to perform a comparing operation, and, if the comparing operation is successful, to access and transmit a message to the user. The first database is configured to store representative data integers and configured to be accessed during the comparing operation to compare the search request integer to the stored representative data integers, the stored representative data being integers generated by a mathematical function acting on a dataset of search terms. The transmitter is configured to send a signal to a second database configured to store messages corresponding to the representative data integers from which the message that is transmitted is accessed.

According to a second embodiment, a method is provided. A search request received from a user is converted to a search request integer value using an operational portion of a chip in network equipment. The search request integer value is compared to representative data integer values that were previously converted from a dataset of search terms using the operational portion, the representative integer values being stored on the chip. If the comparing is successful, a signal is transmitted to a second database, the signal being used by the second database to determine a message to be transmitted to the user that corresponds to the representative data integer.

According to a third embodiment, another method is provided. A dataset of previously used search terms generated by an advertising system is received. Hashes are generated from the dataset using a hashing function. The hashes are stored in a database that is on a chip of a network device, the chip is used to: choose a message to send to a user based on a hash of a search request from a user, compare the hash of the search request to the hashes in the first database, and, if the comparing is successful, access the message from a second database, the message corresponding to the matched hashes.

Further features and advantages of the embodiments, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

FIG. 1 shows a system 100, according to an embodiment of the present invention. For example, system 100 can be a network 102 (e.g., the Internet, or the like) coupling together various equipment of various users of the network. In the example shown, system 100 can include an advertising system 104 (e.g., commercial or public advertising system for commercial or political messages and information) coupled to a message database 105 (e.g., a message database, targeted advertising database, information database, or the like), network equipment 106 of an ISP 108, a user device 110, and a search provider 112.

As can be appreciated, there may be more than one advertising system 104-n, each having its own corresponding message database 105-n, more than one user device 110-n, and potentially more than one ISP 108-n, n being a positive integer.

In the example shown, ISP 108 can provide one or more pieces of network equipment 106-n to be located either within user device 110 or coupled to user device 110, or both.

In the example shown, as discussed below, search provider 112 is limited to providing search results and not any targeted messages.

As described in more detail below, and similar to as described above, system 100 can be used to perform internet searches. For example, a user, through user device 110, enters and transmits a search request, which includes search terms. The search request is transmitted to search provider 112 via one or more pieces of network equipment 106. However, instead of search provider 112 matching a targeted message to the search terms, in addition to search results, the targeted message is determined by network equipment 106, which then sends a signal to advertiser 104 used to choose a message in database 105, which message is sent to the user. Therefore, through this system, the network equipment owner can generate advertisement revenue by utilizing network equipment 106 to match and control targeted messages corresponding to the search request to user device 110.

Figure 2:
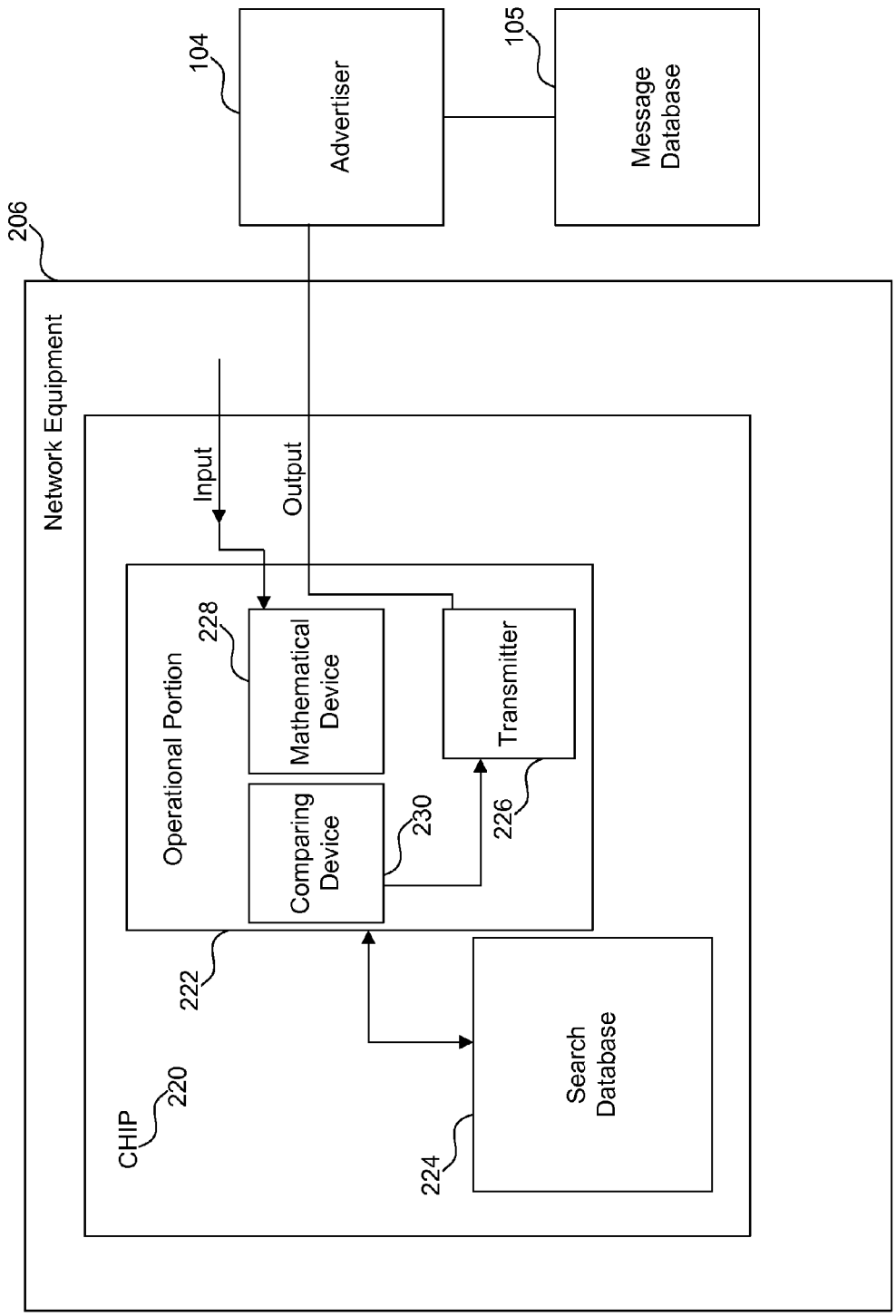
FIG. 2 shows network equipment, according to an embodiment of the present invention.

FIG. 2 shows a piece of network equipment 206, according to an embodiment of the present invention. For example, network equipment 206 can be used in system 100 as network equipment 106-n. In the example shown, network equipment 206 includes a chip 220 having an operational portion 222, a first database 224 (e.g., a search database), and a transmitter 226.

In the example shown, operational portion 222 includes a mathematical device 228 and a comparing device 230. However, as can be appreciated by a skilled artisan, many more devices can be included in operational portion 222, as well as there being more than one operational portion 222 on chip 220 to perform other functions required by the network equipment 106. The other devices and other operations of operational portion 222 are all contemplated within the scope of this application, but details of these other devices and operations are not necessary to understand the embodiments described herein, and therefore not provided.

In one example, network equipment 206 (or network equipment 106-n shown in FIG. 1) can be a base station, a router, a switch, a set-top box, or the like, or located within a user device (not shown), all these examples are provided without limitation. For example, when in a user device, the user device can be any mobile communications device or other type of device that allows for internet searching operations, e.g., a cellular phone, a personal digital assistant, or the like. Again, the specific operation of the network equipment 106/206 is outside the scope of this application, as is generally known to those skilled in the relevant arts.

In one example, database 224 stores representative data corresponding to many datasets of known search terms that are used in searching. The datasets can be based on many different sources, as is well known in the art. In order to allow for database 224 to be located on chip 220, the representative data is in the form of hashes of the datasets. As is known and understood to skilled artisans, datasets can be processed using hashing functions to allow for any amount of original data to be represented by a single integer value or hash. The hashes, or integer value, can be thought of as an index to an array of values. As examples, and without limitation, hashes can be known as and referred to as a hash, hash values, hash sums, hash codes, checksums, or hashes. Hash functions are mostly used to accelerate table lookup or data comparison tasks, such as finding items in a database, detecting duplicated or similar records in a large file, finding similar stretches in DNA sequences, and so on. As the performing of hashing is well known, the many hashing operations that can be performed is not detailed within this application, but all methods known and discovered may be used within the scope of these embodiments.

In one example, database 224 stores a hash representing a complete set of a plurality of keywords in a single hash.

In various embodiments, various parties may perform the building of datasets, hashing of the datasets, and storing of the hashes in database 224. This can be done either before or after database 224 is coupled to chip 220 of network device 206. The particular party that generated the datasets and/or performed the hashing is not limited within the scope of the present invention.

In one example, message database 105, e.g., advertisement database, can include advertisement associated with the datasets, and thus associated with the dataset hashes. For example, advertisers, or political operatives, can correlate what search terms most represent what people looking for certain products or services would want to know, as is known in the relevant arts. Once this correlation is determined, as is discussed below, anytime a hash is matched, its correlated advertisement can be accessed and transmitted to a user device.

In one example, operational portion 222 inspects packets as they pass through network equipment 206 to determine if a packet contains a search request. When a search request is detected by operational portion 222, the search request is forward to mathematical device 228.

In one example, mathematical device 228 comprises a hashing device (not shown) and/or performs a hashing operation, using a hash function on a search request passing through network equipment 206. Through use of a hashing, a large search request can be converted into a hash value, as discussed above.

In one example, comparing device 230 attempts to match the search request hash to a stored dataset hash in database 224. If a match is determined, the stored dataset hash is used to generate a signal transmitted by transmitter 226 to one or more advertisers 104. The one or more advertisers 104 use the signal to access the correlated message, i.e., targeted advertisement, in database 105. The correlated message is then transmitted to the user device. For example, in one scenario each of a plurality of advertisers can have unique hashes assigned to them in database 224. When a search request hash matches, the signal will be transmitted to the appropriate advertiser. In another example, multiple advertisers may share the same hashes. Then, when a search request matches, signals may be sent to the multiple advertisers or a predetermined one or more of the advertisers. In one instance, a first time there is a match the signal is sent to a first advertiser, while the second time there is a match the signal is sent to a second advertiser, and so on. In another instance, the first time there is a match the signal is randomly sent to one of the multiple advertisers, and so on after each match. Many different alternative arrangements can be made when more than one advertiser is associated with the scheme.

Figure 3:
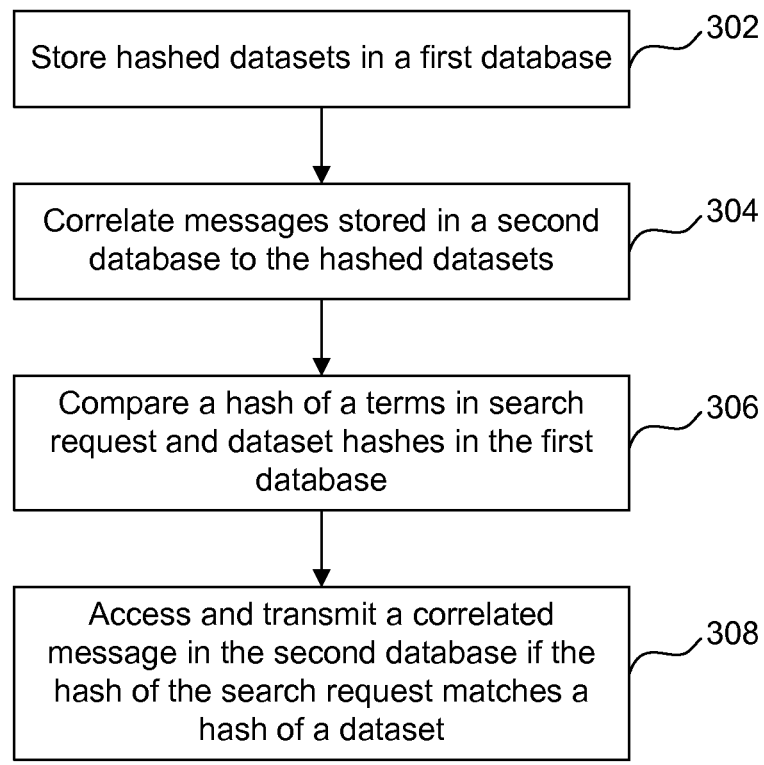
FIGS. 3-7 show flowcharts depicting methods, according to various embodiment of the present invention.

FIG. 3 illustrates a flow chart depicting a method 300, according to an embodiment of the present invention. For example, method 300 can be performed using one or more of the elements illustrated in FIGS. 1 and 2. In addition, it is to be appreciated the operations discussed for method 300 may be performed in a different order or may be optional, in various embodiments.

In step 302, hashed datasets are stored in a first database.

In step 304, messages stored in a second database are correlated to the hashed datasets.

In step 306, a comparison is made between a hash of a terms in search request and dataset hashes in the first database.

In step 308, if the hash of the search request matches a hash of a dataset, a correlated message in the second database is accessed and transmitted. For example, a signal is sent to an advertisement system, which accesses the message from a message database.

In one example, the accuracy of matching of the hash of the search request and the hash of the datasets is not a consideration, such that if a wrong advertisement is sent there is no detrimental effect. For example, due to hash aliasing, although a hash is accurate, two different datasets can hash to the same value, which causes an error when choosing the correct message to send to the user.

Figure 4:
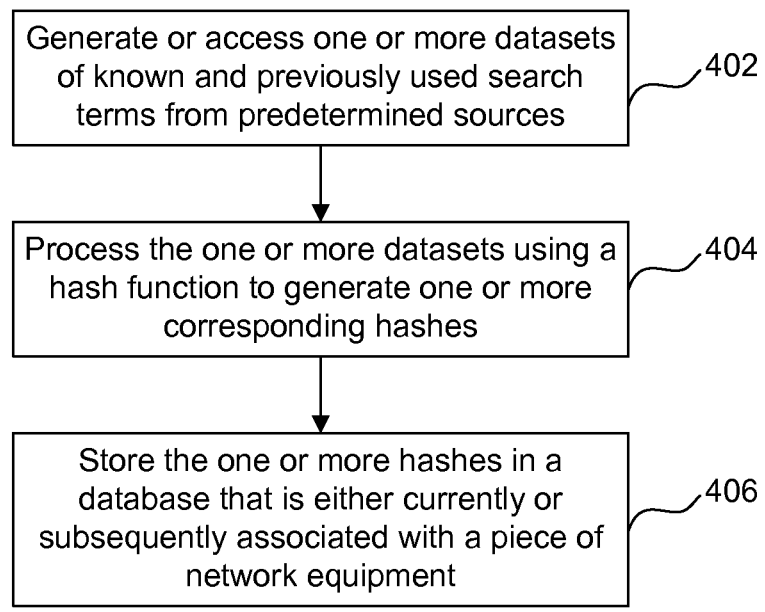

FIG. 4 illustrates a flow chart depicting a method 400, according to an embodiment of the present invention. For example, method 400 can be performed using one or more of the elements illustrated in FIGS. 1 and 2. In addition, it is to be appreciated the operations discussed for method 400 may be performed in a different order or may be optional, in various embodiments. In the example shown, method 400 illustrates exemplary detailed operations of step 302 in method 300 of FIG. 3.

In step 402, one or more datasets of known and previously used search terms are generated or accessed from predetermined sources.

In step 404, the one or more datasets are processed using a hash function to generate one or more corresponding hashes, e.g., representations of the datasets.

In step 406, the one or more hashes are stored in a database that is either currently or subsequently associated with a piece of network equipment.

It is to be appreciated that as the source of the dataset is updated with additional datasets, or the datasets themselves are updated, the one or more corresponding hashes can also be updated, which updates are propagated to the database. For example, updating can be based on a specific user or group of users search terms. The updating can be done periodically, manually, automatically, or otherwise and with or without a request or knowledge of the network equipment, network equipment owner, or down-stream user of the network equipment.

Figure 5:
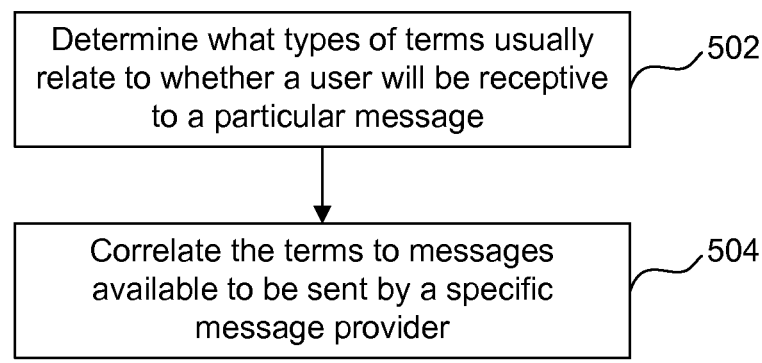

In FIG. 5, a flowchart depicting a method 500 is shown, according to an embodiment of the present invention. For example, method 500 can be performed using one or more of the elements illustrated in FIGS. 1 and 2. In addition, it is to be appreciated the operations discussed for method 500 may be performed in a different order or may be optional, in various embodiments. In the example shown, method 500 illustrates exemplary detailed operations of step 304 in method 300 of FIG. 3.

In step 502, an advertiser or other message generator determines what types of terms usually relate to whether a user will be receptive to a particular message.

In step 504, the terms are correlated to messages available to be sent by a specific message provider. For example, once the types of terms are developed, and grouped, by the message provider the groups of terms can be associated or correlated to specific known datasets, for which representations of the datasets are stored in step 302 and 402.

Figure 6:
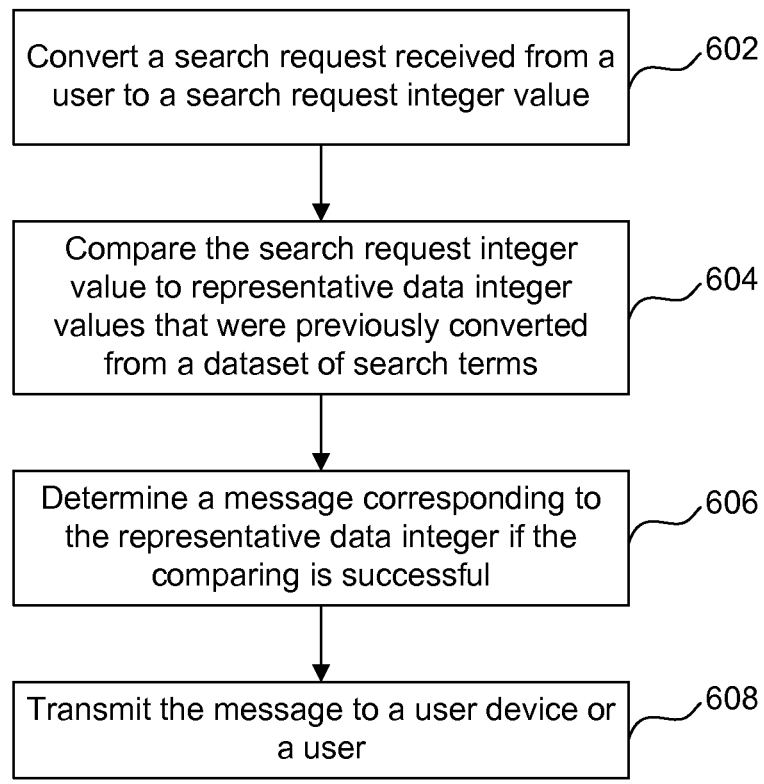

In FIG. 6, a flowchart depicting a method 600 is shown, according to an embodiment of the present invention. For example, method 600 can be performed using one or more of the elements illustrated in FIGS. 1 and 2. In addition, it is to be appreciated the operations discussed for method 600 may be performed in a different order or may be optional, in various embodiments.

In step 602, a search request received from a user is converted to a search request integer value. For example, a hash value.

In step 604, the search request integer value is compared to representative data integer values that were previously converted from a dataset of search terms.

In step 606, if the comparing is successful, a message corresponding to the representative data integer is determined.

In step 608, the message is transmitted to a user device or a user.

Figure 7:
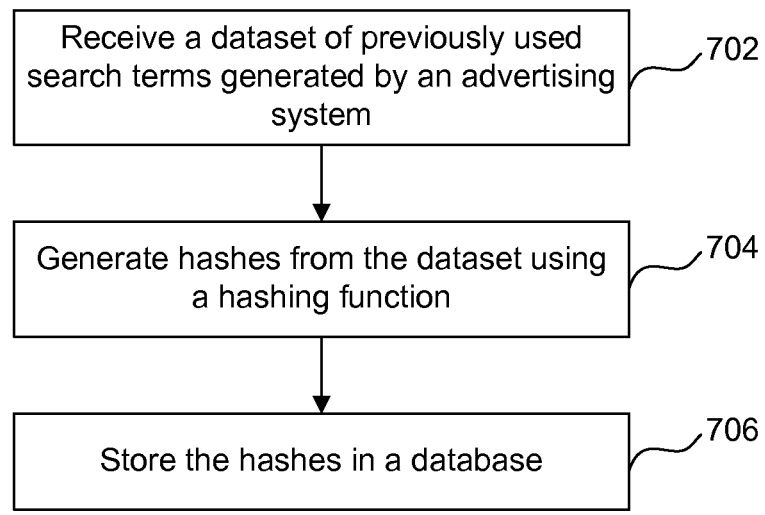

In FIG. 7, a flowchart depicting a method 700 is shown, according to an embodiment of the present invention. For example, method 700 can be performed using one or more of the elements illustrated in FIGS. 1 and 2. In addition, it is to be appreciated the operations discussed for method 700 may be performed in a different order or may be optional, in various embodiments.

In step 702, a dataset of previously used search terms generated by the users, and catalogued by an advertising system is received.

In step 704, hashes are generated from the dataset using a hashing function.

In step 706, the hashes are stored in a database. For example, the database may be on or subsequently coupled to a chip of a network device. The chip can be used to: choose a message to send to a user based on a hash of a search request from a user, compare the hash of the search request to the hashes in the first database, and, if the comparing is successful, access the message from a second database, the message corresponding to the matched hashes.

It is to be appreciated that the Detailed Description section, and not the Abstract section, is intended to be used to interpret the claims. The Abstract section may set forth one or more, but not all, exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A chip on service provider network equipment, the chip comprising:
    a processor configured to detect a search request as part of a communication message being routed from a user to a search provider by the network equipment,
    the processor further configured to generate a search request integer based at least in part on performing a hash function on the search request, configured to perform a comparing operation, and, when the comparing operation is successful, configured to access and transmit a message to the user; and
    a first database configured to store at least one of a plurality of representative data integers, the first database being accessed during the comparing operation to compare the search request integer to the stored at least one of the plurality of representative data integers, the stored at least one of the plurality of representative data integers being integers generated by at least one of a plurality of hash functions acting on a dataset of a plurality of search terms, wherein
    the processor is configured to send a signal to a second database configured to store a plurality of targeted advertisements and select a targeted advertisement to send the user based on the signal, and
    the plurality of targeted advertisements correspond to at least a respective one of the plurality of representative data integers.

2. The chip of claim 1, wherein the network equipment is coupled to a user device that is used to generate the search request.

3. The chip of claim 1, wherein the first database is updated when the dataset of the plurality of search terms is updated by a plurality of searches performed by the user.

4. The chip of claim 1, wherein the plurality of targeted advertisements in the second database are updated.

5. The chip of claim 1, wherein the network equipment is a base station, a router, or a switch.

6. The chip of claim 1, wherein at least one of the plurality of targeted advertisements comprises political information.

7. A method, comprising:
    detecting, using an operational portion of a chip in a network equipment, a search request as part of a communication message being routed from a user to a search provider;
    converting, using the operational portion of the chip in the network equipment, the search request to a search request integer value;
    comparing, using the operational portion of the chip in the network equipment, the search request integer value to a plurality of representative data integer values that were previously converted from a dataset of search terms, the plurality of representative data integer values being stored on the chip in a first database;
    when the comparing is successful, transmitting a signal to a second database, the signal being used by the second database to determine a targeted advertisement stored in the second database for transmitting to the user, wherein the targeted advertisement corresponds to a respective one of the plurality of representative data integer values that matched the search request integer value; and
    correlating a plurality of targeted advertisements stored in the second database to the plurality of representative data integer values stored in the first database.

8. The method of claim 7, further comprising using a hash function to generate the search request integer value and the stored plurality of representative data integer values.

9. The method of claim 7, further comprising coupling the network equipment to a user device that is used to generate the search request.

10. The method of claim 7, further comprising updating the first database when the dataset of search terms is updated by at least one of a plurality of searches performed by the user.

11. The method of claim 7, further comprising updating the second database to include the plurality of targeted advertisements related to the search request.

12. The method of claim 7, further comprising using a base station, router, or a switch as the network equipment.

13. The method of claim 7, wherein the targeted advertisement comprises political information.

14. A method comprising:
    processing a dataset of a plurality of previously used search terms, the dataset being generated by an advertising system;
    generating a plurality of hashes from the dataset by using a hashing function;
    storing the plurality of hashes in a first database that is on a chip of a network device, where the chip is configured to choose a targeted advertisement stored in a second database to send to a user based on a search hash of a search request detected by the network device from the user as part of a communication message being routed from the user to a search provider, configured to compare the search hash of the search request to the plurality of hashes stored in the first database, and, when the comparing is successful, the chip is configured to access the targeted advertisement from the second database, the targeted advertisement in the second database corresponding to the search hash stored in the first database; and correlating a plurality of targeted advertisements stored in the second database to the plurality of hashes stored in the first database.

15. The chip of claim 1, wherein the network equipment is associated with an internet service provider.

16. The chip of claim 1, wherein an individual one of the plurality of targeted advertisements in the second database comprises content identified by an advertiser as relevant to respective ones of the plurality of search terms associated with the plurality of representative data integers in the first database.

17. The method of claim 7, wherein the network equipment is associated with an internet service provider.

18. The method of claim 7, wherein the targeted advertisement in the second database comprises content identified by an advertiser as relevant to respective ones of the dataset of search terms associated with the plurality of representative data integer values in the first database.

19. The method of claim 7, further comprising performing a hashing operation on the dataset of search terms to generate the plurality of representative data integer values.

20. The method of claim 7, further comprising performing a hashing operation on the search request to generate the search request integer value.

\* \* \* \* \*